United States Patent
Tateishi et al.

(10) Patent No.: US 8,843,818 B2
(45) Date of Patent: Sep. 23, 2014

(54) FIELD CORRELATION METHOD AND SYSTEM, AND PROGRAM THEREOF

(75) Inventors: Kenji Tateishi, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 665 days.

(21) Appl. No.: 12/530,554

(22) PCT Filed: Mar. 4, 2008

(86) PCT No.: PCT/JP2008/053814
§ 371 (c)(1),
(2), (4) Date: Sep. 9, 2009

(87) PCT Pub. No.: WO2008/111424
PCT Pub. Date: Sep. 18, 2008

(65) Prior Publication Data
US 2010/0100804 A1  Apr. 22, 2010

(30) Foreign Application Priority Data
Sep. 3, 2007  (JP) ................................ 2007-059990

(51) Int. Cl.
*G06F 17/21*  (2006.01)
*G06F 17/30*  (2006.01)

(52) U.S. Cl.
CPC .............................. *G06F 17/30289* (2013.01)
USPC ......................................................... 715/225

(58) Field of Classification Search
USPC ................................. 715/227, 225
See application file for complete search history.

(56) References Cited

U.S. PATENT DOCUMENTS

| | | | |
|---|---|---|---|
| 6,925,468 B1 * | 8/2005 | Bobbitt et al. | 707/703 |
| 6,985,898 B1 * | 1/2006 | Ripley et al. | 1/1 |
| 7,299,240 B1 * | 11/2007 | Crozier | 1/1 |
| 7,546,304 B1 * | 6/2009 | Doughty | 1/1 |
| 8,086,614 B2 * | 12/2011 | Novy | 707/752 |
| 2002/0091691 A1 * | 7/2002 | Sharp | 707/7 |
| 2003/0225780 A1 * | 12/2003 | Adams et al. | 707/102 |
| 2003/0236785 A1 | 12/2003 | Shintani et al. | |
| 2004/0107189 A1 * | 6/2004 | Burdick et al. | 707/3 |
| 2007/0027845 A1 * | 2/2007 | Dettinger et al. | 707/3 |
| 2007/0156736 A1 * | 7/2007 | Bestgen et al. | 707/101 |

(Continued)

FOREIGN PATENT DOCUMENTS

| | | |
|---|---|---|
| JP | 05-054083 A | 3/1993 |
| JP | 08-249338 A | 9/1996 |

(Continued)

OTHER PUBLICATIONS

Rahm et al., A Survey of Approaches to Automatic Schema Matching, Springer-Verglag, The VLDB Journal 10, 2001, p. 334-350.*

(Continued)

*Primary Examiner* — Frank D Mills
(74) *Attorney, Agent, or Firm* — Sughrue Mion, PLLC

(57) ABSTRACT

A field pair as a combination of a definite field and an indefinite field is decided and a correlation value between the definite field and the indefinite field in each of the field pairs is calculated. Among the field pairs in which the correlation value is not smaller than a threshold value, indefinite fields having corresponding definite fields which belong to the same field group are made to be a new field group.

31 Claims, 13 Drawing Sheets

STEP 1:

TBL 1

| | DEFINITE FIELD | | |
|---|---|---|---|
| | GROUP 1 FAMILY NAME | GROUP 2 GIVEN NAME | GROUP 3 AGE |
| INDEFINITE FIELD | | | |
| MARRIED | 0 | 0.09 | 1 |
| GENDER | 0 | 1 | 0 |

TBL 2

| | DEFINITE FIELD | | |
|---|---|---|---|
| | GROUP 1 | GROUP 2 | GROUP 3 |
| | Last | Fast | Age |
| INDEFINITE FIELD | | | |
| C1 | 0 | 0.09 | 1 |
| C2 | 0 | 1 | 0.32 |

STEP 2:

| INDEFINITE FIELD | DEFINITE FIELDS IN WHICH CORRELATION VALUE EXCEEDS THRESHOLD |
|---|---|
| TBL 1 | |
| MARRIED | GROUP 3: AGE |
| GENDER | GROUP 2: GIVEN NAME |
| TBL 2 | |
| C1: | GROUP 3: Age |
| C2: | GROUP 2: Fast |

NEW FIELD GROUP

TBL 1: MARRIED ⇔ TBL 2: C1
TBL 1: GENDER ⇔ TBL 2: C2

(56) References Cited

U.S. PATENT DOCUMENTS

| | | | |
|---|---|---|---|
| 2007/0226085 A1* | 9/2007 | Roach et al. | 705/28 |
| 2008/0016047 A1* | 1/2008 | Dettinger et al. | 707/4 |
| 2008/0140694 A1* | 6/2008 | Mangla | 707/102 |
| 2008/0313204 A1* | 12/2008 | Schultz et al. | 707/101 |
| 2009/0326973 A1* | 12/2009 | Hurewitz | 705/1 |
| 2010/0057797 A1* | 3/2010 | Pitman et al. | 707/722 |

FOREIGN PATENT DOCUMENTS

| | | |
|---|---|---|
| JP | 2004029902 A | 1/2004 |
| JP | 2004-086782 A | 3/2004 |
| JP | 2004227037 A | 8/2004 |
| JP | 2005063332 A | 3/2005 |
| JP | 2006-004411 A | 1/2006 |
| JP | 2006-099236 A | 4/2006 |

OTHER PUBLICATIONS

International Search Report for PCT/JP2008/053814 mailed Jun. 10, 2008.

Japanese Office Action for JP2009-503971 mailed on Aug. 29, 2012.

* cited by examiner

FIG. 3

TBL 1

| FAMILY NAME | GIVEN NAME | AGE | MARRIED | GENDER |
|---|---|---|---|---|
| MOTOKI | TAKATOSHI | 62 | 1 | 0 |
| IWAMA | TAKATOSHI | 29 | 0 | 0 |
| MORINAGA | YUKIKO | 43 | 1 | 1 |
| HIRATA | JYUNKO | 52 | 1 | 1 |
| TASHIRO | YUKIKO | 13 | 0 | 1 |
| KONDOU | TAKAO | 16 | 0 | 0 |
| AIDA | YUKIKO | 25 | 1 | 1 |
| KANEDA | TAKATOSHI | 18 | 0 | 0 |
| OOKI | JYUNKO | 32 | 1 | 1 |
| SUZUKI | TOORU | 40 | 1 | 0 |
| TAKAHASHI | TOMOKO | 62 | 1 | 1 |

NUMBER, AVERAGE 0.5
NUMBER, AVERAGE 0.5

TBL 2

| Last | First | Age | C1 | C2 |
|---|---|---|---|---|
| YAMADA | KENJI | 22 | 1 | 0 |
| SAITOU | KENJI | 15 | 1 | 0 |
| TANAKA | HANAKO | 38 | 0 | 1 |
| YAMAMOTO | YOUSUKE | 62 | 1 | 1 |
| TATEISHI | KENJI | 31 | 1 | 1 |
| SATOU | YOUSUKE | 11 | 1 | 0 |
| OOTA | YUU | 26 | 0 | 0 |
| KIDA | YUU | 18 | 0 | 0 |
| TUCHIDA | HANAKO | 26 | 0 | 0 |
| KONDO | TUYOSHI | 41 | 1 | 1 |
| TOKUDA | HANAKO | 54 | 0 | 1 |

FIG. 7

TBL 1

| FAMILY NAME | GIVEN NAME | AGE | MARRIED | GENDER |
|---|---|---|---|---|
| MOTOKI | TAKATOSHI | 62 | 1 | 0 |
| IWAMA | TAKATOSHI | 29 | 0 | 0 |
| MORINAGA | YUKIKO | 43 | 1 | 1 |
| HIRATA | JUNKO | 52 | 1 | 1 |
| TASHIRO | YUKIKO | 13 | 0 | 1 |
| KONDOU | TAKAO | 16 | 0 | 0 |
| AIDA | YUKIKO | 25 | 1 | 1 |
| KANEDA | TAKATOSHI | 18 | 0 | 0 |
| OOKI | JUNKO | 32 | 1 | 1 |
| SUZUKI | TOORU | 40 | 1 | 0 |
| TAKAHASHI | TOMOKO | 62 | 1 | 1 |

TBL 2

| Last | First | Age | C1 | C2 |
|---|---|---|---|---|
| YAMADA | KENJI | 22 | 1 | 0 |
| SAITOU | KENJI | 15 | 1 | 0 |
| TANAKA | HANAKO | 38 | 0 | 1 |
| YAMAMOTO | YOUSUKE | 62 | 1 | 1 |
| TATEISHI | KENJI | 31 | 1 | 1 |
| SATOU | YOUSUKE | 11 | 1 | 0 |
| OOTA | YUU | 26 | 0 | 0 |
| KIDA | YUU | 18 | 0 | 0 |
| TUCHIDA | HANAKO | 26 | 0 | 0 |
| KONDOU | TUYOSHI | 41 | 1 | 1 |
| TOKUDA | HANAKO | 54 | 0 | 1 |

FIG. 8

| TABLE NAME | FIELD NAME | FIELD TYPE |
|---|---|---|
| TBL 1 | FAMILY NAME | CHARACTER STRING |
| TBL 1 | GIVEN NAME | CHARACTER STRING |
| TBL 1 | AGE | NUMERICAL VALUE |
| TBL 1 | MARRIED | CATEGORY |
| TBL 1 | GENDER | CATEGORY |
| TBL 2 | Last | CHARACTER STRING |
| TBL 2 | First | CHARACTER STRING |
| TBL 2 | Age | NUMERICAL VALUE |
| TBL 2 | C1 | CATEGORY |
| TBL 2 | C2 | CATEGORY |

FIG. 9

| TABLE NAME | INDEFINITE FIELD NAME | DEFINITE FIELD NAME | CORRELATION VALUE |
|---|---|---|---|
| TBL 1 | MARRIED | FAMILY NAME | 0 |
| TBL 1 | MARRIED | GIVEN NAME | 0.09 |
| TBL 1 | MARRIED | AGE | 1 |
| TBL 1 | GENDER | FAMILY NAME | 0 |
| TBL 1 | GENDER | GIVEN NAME | 1 |
| TBL 1 | GENDER | AGE | 0 |
| TBL 2 | C1 | Last | 0 |
| TBL 2 | C1 | First | 1 |
| TBL 2 | C1 | Age | 0.32 |
| TBL 2 | C2 | Last | 0 |
| TBL 2 | C2 | First | 0.09 |
| TBL 2 | C2 | Age | 1 |

FIG. 10

| TABLE NAME | FIELD NAME | FIELD GROUP ID | CORRELATION FIELD |
|---|---|---|---|
| TBL 1 | FAMILY NAME | 1 | |
| TBL 1 | GIVEN NAME | 2 | |
| TBL 1 | AGE | 3 | |
| TBL 1 | MARRIED | | |
| TBL 1 | GENDER | | |
| TBL 2 | Last | 1 | |
| TBL 2 | First | 2 | |
| TBL 2 | Age | 3 | |
| TBL 2 | C1 | | |
| TBL 2 | C2 | | |

| TABLE NAME | FIELD NAME | FIELD GROUP | CORRELATION FIELD |
|---|---|---|---|
| TBL 1 | FAMILY NAME | 1 | |
| TBL 1 | GIVEN NAME | 2 | |
| TBL 1 | AGE | 3 | MARRIED |
| TBL 1 | MARRIED | 4 | AGE |
| TBL 1 | GENDER | 5 | GIVEN NAME |
| TBL 2 | Last | 1 | |
| TBL 2 | First | 2 | |
| TBL 2 | Age | 3 | C2 |
| TBL 2 | C1 | 5 | Last |
| TBL 2 | C2 | 4 | Age |

FIG. 13

TBL 1

| FAMILY NAME | GIVEN NAME CORRELATION 1 | AGE CORRELATION 2 | MARRIED CORRELATION 2 | GENDER CORRELATION 1 |
|---|---|---|---|---|
| MOTOKI | TAKATOSHI | 62 | 1 | 0 |
| IWAMA | TAKATOSHI | 29 | 0 | 0 |
| MORINAGA | YUKIKO | 43 | 1 | 1 |
| HIRATA | JUNKO | 52 | 1 | 1 |
| TASHIRO | YUKIKO | 13 | 0 | 0 |
| KONDOU | TAKAO | 16 | 0 | 1 |
| AIDA | YUKIKO | 25 | 1 | 0 |
| KANEDA | TAKATOSHI | 18 | 0 | 1 |
| OOKI | JUNKO | 32 | 1 | 0 |
| SUZUKI | TOORU | 40 | 1 | 1 |
| TAKAHASHI | TOMOKO | 62 | 1 | 1 |

TBL 2

| Last | First CORRELATION 1 | Age CORRELATION 2 | C1 CORRELATION 1 | C2 CORRELATION 2 |
|---|---|---|---|---|
| YAMADA | KENJI | 22 | 1 | 0 |
| SAITOU | KENJI | 15 | 1 | 0 |
| TANAKA | HANAKO | 38 | 0 | 1 |
| YAMAMOTO | YOUSUKE | 62 | 1 | 1 |
| TATEISHI | KENJI | 31 | 1 | 1 |
| SATOU | YOUSUKE | 11 | 1 | 0 |
| OOTA | YUU | 26 | 0 | 0 |
| KIDA | YUU | 18 | 0 | 0 |
| TUCHIDA | HANAKO | 26 | 0 | 0 |
| KONDOU | TUYOSHI | 41 | 1 | 1 |
| TOKUDA | HANAKO | 54 | 0 | 1 |

FIG. 14

VALUE OF CORRELATION OF FIELD BETWEEN TWO FIELDS
IN CASE OF CATEGORY AND CATEGORY

| F1 | F2 |
|----|----|
| 0  | 1  |
| 0  | 1  |
| 1  | 0  |
| 1  | 0  |
| 1  | 0  |
| 2  | 1  |
| 2  | 1  |
| 2  | 1  |
| 3  | 0  |
| 3  | 0  |

INFORMATION QUANTITY OF F1
$H(F1)$
$= -0.2\log_2 0.2 -0.3\log_2 0.3 -0.3\log_2 0.3 -0.2\log_2 0.2$
$= 1.97$ $P(F1=0) \rightarrow 0.2$
$P(F1=1) \rightarrow 0.3$
$P(F1=2) \rightarrow 0.3$
$P(F1=3) \rightarrow 0.2$ INFORMATION QUANTITY OF F2
$H(F2)$
$= -0.5\log_2 0.5 -0.5\log_2 0.5$
$= 1$ $P(F2=0) \rightarrow 0.5$
$P(F2=1) \rightarrow 0.5$ INFORMATION QUANTITY OF F1 AND F2
$H(F1, F2)$
$= -0.2\log_2 0.2 -0.3\log_2 0.3 -0.3\log_2 0.3 -0.2\log_2 0.2$
$= 1.97$ $P(F1=0 \wedge F2=1) \rightarrow 0.2$
$P(F1=1 \wedge F2=0) \rightarrow 0.3$
$P(F1=2 \wedge F2=1) \rightarrow 0.3$
$P(F1=3 \wedge F2=0) \rightarrow 0.2$ CORRELATION DEGREE OF F1 AND F2 =
$H(F1)+H(F2)-H(F1,F2))/(H(F1)+H(F2)-\max(H(F1),H(F2))$
$=$
$(1.97+1-1.97)/(1.97+1-1.97)=1$

FIG. 15

VALUE OF CORRELATION OF FIELD BETWEEN FIELDS
IN CASE OF CATEGORY AND NUMERICAL VALUE

| F1 | F2 |
|----|----|
| 62 | 1  |
| 29 | 0  |
| 43 | 1  |
| 52 | 1  |
| 13 | 0  |
| 16 | 0  |
| 25 | 1  |
| 18 | 0  |
| 32 | 1  |
| 40 | 1  |
| 62 | 1  |

AVERAGE VALUE OF F1
Ave(F1)
=35.63636
STANDARD DEVIATION OF F1
STDEV(F1)
=17.63674

DATA OF
F1>Ave(F1)+STDEV(F1)
=53.27310
IS SAMPLED AS 1

DATA OF
F1<Ave(F1)-STDEV(F1)
=17.99972
IS SAMPLED AS 0

| F1 | F2 |
|----|----|
| 1  | 1  |
| 0  | 0  |
| 0  | 0  |
| 1  | 1  |

IDENTICAL TO CORRELATION
DEGREE CALCULATION OF
CATEGORY AND CATEGORY

CORRELATION DEGREE OF F1
AND F2=1

FIG. 16

VALUE OF CORRELATION OF FIELD BETWEEN FIELDS IN CASE OF CATEGORY AND CHARACTER STRING

| F1 | F2 |
|---|---|
| TAKATOSHI | 0 |
| TAKATOSHI | 0 |
| YUKIKO | 1 |
| JUNKO | 1 |
| YUKIKO | 1 |
| TAKAO | 0 |
| YUKIKO | 1 |
| TAKATOSHI | 0 |
| JUNKO | 1 |
| TOORU | 0 |
| TOMOKO | 1 |

APPEARANCE FREQUENCY OF VALUE OF F1 IS OBTAINED AND RECORDS OF WHICH NUMBER EXCEEDS 30% OF ENTIRETY ARE SAMPLED IN DESCENDING ORDER OF APPEARANCE FREQUENCY.

HOWEVER, WHEN APPEARANCE FREQUENCY BECOMES 1 BEFORE NUMBER OF SAMPLED RECORDS REACHES 30%, CORRELATION DEGREE OF F1 AND F2 IS DEFINED TO BE 0.

| F1 | F2 |
|---|---|
| TAKATOSHI | 0 |
| TAKATOSHI | 0 |
| TAKATOSHI | 0 |
| YUKIKO | 1 |
| YUKIKO | 1 |
| YUKIKO | 1 |

IDENTICAL TO CORRELATION DEGREE CALCULATION OF CATEGORY AND CATEGORY

CORRELATION DEGREE OF F1 AND F2=1

FIG. 17

VALUE OF CORRELATION OF FIELD BETWEEN FIELDS IN CASE OF CATEGORY AND CHARACTER STRING ②

(a)

| F1 | F2 |
|---|---|
| OOKI TAKATOSHI | 0 |
| IWAMA TAKATOSHI | 0 |
| MORINAGA YUKIKO | 1 |
| HIRATA JUNKO | 1 |
| OOKI YUKIKO | 1 |
| KONDOU TAKAO | 0 |
| AIDA YUKIKO | 1 |
| KANEDA TAKATOSHI | 0 |
| OOKI JUNKO | 1 |
| SUZUKI TOORU | 0 |
| TAKAHASHI TOMOKO | 1 |

VALUE OF F1 IS DIVIDED INTO WORDS BY EMPLOYING MORPHOLOGICAL ANALYSIS, AND EACH RECORD IS DIVIDED INTO PLURAL RECORDS FOR EACH WORD OF F1.

(b)

| F1 | F2 |
|---|---|
| OOKI | 0 |
| TAKATOSHI | 0 |
| IWAMA | 0 |
| TAKATOSHI | 0 |
| MORINAGA | 1 |
| YUKIKO | 1 |
| HIRATA | 1 |
| JUNKO | 1 |
| OOKI | 1 |
| YUKIKO | 1 |
| KONDO | 0 |
| TAKAO | 0 |
| AIDA | 1 |
| YUKIKO | 1 |
| KANEDA | 0 |
| TAKATOSHI | 0 |
| OOKI | 1 |
| JUNKO | 1 |
| SUZUKI | 0 |
| TOORU | 0 |
| TAKAHASHI | 1 |
| TOMOKO | 1 |

APPEARANCE FREQUENCY OF VALUE OF F1 IS OBTAINED AND RECORDS OF WHICH NUMBER EXCEEDS 30% OF ENTIRETY ARE SAMPLED IN DESCENDING ORDER OF APPERANCE FREQUENCY.

HOWEVER, WHEN APPEARANCE FREQUENCY BECOMES 1 BEFORE NUMBER OF SAMPLED RECORDS REACHES 30%, CORRELATION DEGREE OF F1 AND F2 IS DEFINED TO BE 0.

| F1 | F2 |
|---|---|
| TAKATOSHI | 0 |
| TAKATOSHI | 0 |
| TAKATOSHI | 0 |
| YUKIKO | 1 |
| YUKIKO | 1 |
| YUKIKO | 1 |
| OOKI | 0 |
| OOKI | 1 |
| OOKI | 1 |

IDENTICAL TO CORRELATION DEGREE CALCULATION OF CATEGORY AND CATEGORY

CORRELATION DEGREE OF F1 AND F2=0.69

FIG. 18

VALUE OF CORRELATION OF FIELD BETWEEN FIELDS IN CASE OF NUMERICAL VALUE AND NUMERICAL VALUE

| F1 | F2 |
|----|----|
| 0  | 10 |
| 1  | 11 |
| 2  | 12 |
| 3  | 13 |
| 4  | 14 |
| 5  | 15 |
| 6  | 16 |
| 7  | 17 |
| 8  | 18 |
| 9  | 19 |

AVERAGE VALUE OF F1
Ave(F1)=4.5

AVERAGE VALUE OF F2
Ave(F2)=14.5

| F1   | F2   |
|------|------|
| -4.5 | -4.5 |
| -3.5 | -3.5 |
| -2.5 | -2.5 |
| -1.5 | -1.5 |
| -0.5 | -0.5 |
| 0.5  | 0.5  |
| 1.5  | 1.5  |
| 2.5  | 2.5  |
| 3.5  | 3.5  |
| 4.5  | 4.5  |

CORRELATION DEGREE(F1,F2)
=
|cosine(F1,F2)|
=1

FIG. 19

CALCULATION OF VALUE OF CORRELATION OF FIELD BETWEEN PLURALITY OF DEFINITE FIELDS AND ONE INDEFINITE FIELD

| F11 | F12 | F2 |
|-----|-----|----|
| 0   | 1   | 0  |
| 0   | 1   | 0  |
| 1   | 1   | 1  |
| 1   | 0   | 0  |
| 1   | 1   | 1  |
| 0   | 1   | 0  |
| 1   | 1   | 1  |
| 1   | 0   | 0  |
| 1   | 1   | 1  |
| 0   | 1   | 0  |

INFORMATION QUANTITY OF F11 AND F12
$H(F11,F12)$
=
$-0.4\log_2 0.4$
$-0.2\log_2 0.2$
$-0.4\log_2 0.4$
$=1.52$ $P(F11=0 \land F12=0) \rightarrow 0$
$P(F11=0 \land F12=1) \rightarrow 0.4$
$P(F11=1 \land F12=0) \rightarrow 0.2$
$P(F11=1 \land F12=1) \rightarrow 0.4$ INFORMATION QUANTITY OF F2
$H(F2)$
=
$-0.6\log_2 0.6$
$-0.4\log_2 0.4$
$=0.972$ $P(F2=0) \rightarrow 0.6$
$P(F2=1) \rightarrow 0.4$ INFORMATION QUANTITY OF F11, F12 AND F2
$H(F11,F12,F2)$
=
$-0.4\log_2 0.4$
$-0.2\log_2 0.2$
$-0.4\log_2 0.4$
$=1.52$ $P(F11=0 \land F12=0 \land F2=0) \rightarrow 0$
$P(F11=0 \land F12=0 \land F2=1) \rightarrow 0$
$P(F11=0 \land F12=1 \land F2=0) \rightarrow 0.4$
$P(F11=0 \land F12=1 \land F2=1) \rightarrow 0$
$P(F11=1 \land F12=0 \land F2=0) \rightarrow 0.2$
$P(F11=1 \land F12=0 \land F2=1) \rightarrow 0$
$P(F11=1 \land F12=1 \land F2=0) \rightarrow 0$
$P(F11=1 \land F12=1 \land F2=1) \rightarrow 0.4$ CORRELATION DEGREE OF F1 AND F2=
$H(F1)+H(F2)-H(F1,F2))/(H(F1)+H(F2)-\max(H(F1),H(F2))$
=
$(1.52+0.972-1.52)/(1.52+0.972-1.52)=1$

FIELD CORRELATION METHOD AND SYSTEM, AND PROGRAM THEREOF

The present application is the National Phase of PCT/JP2008/053814 filed on Mar. 4, 2008, which claims priority based on Japanese Patent Application No. 2007-059990 filed on Mar. 9, 2007, disclosure of which is incorporated herein in its entirety.

APPLICABLE FIELD IN THE INDUSTRY

The present invention relates to a field collation method and system for grouping fields that correspond to each other between tables each having a different database, and a program thereof, and more particularly to a field collation method and system for accurately grouping a correspondence of the field that is not characterized in data such as a category value, and a program thereof.

BACKGROUND ART

The so-called field collation signifies grouping of the fields that correspond each other between the tables each having a different database. For example, in FIG. 1, a gender field of TBL 1, an Age field of TBL 2, and an A field of TBL 3 correspond to each other among three tables, i.e. TBL 1 to TBL 3. When a correspondence of the fields between different tables is decided, it becomes possible to integrate the tables, thereby enabling a user to carry out a search striding over the different tables at a time.

Also in such a case, it is not easy to squeeze the fields being manually handled into a limited number of the fields because many tables each of which is consisted of a large number of the fields exist, and the field names of the fields do not coincide with each other in many cases even though the above fields are field partners that correspond to each other. For this reason, it is advisable that the field collation system for automatically grouping the fields that correspond to each other between the tables, or candidates thereof, and proposing a field group to a user makes its appearance.

The conventional field collation system is a system for grouping the field partners of which the features of the data being included in the field coincide with each other (Patent document 1). For example, a family name field of TBL 1 and a Last field of TBL 2 of FIG. 2 correspond to each other. The reason is that a character type of either field is a kanji, and in addition, the family name of a person is used. Due to a similar reason, a given name field of TBL 1 and a First field of TBL 2 correspond to each other. Further, an age field of TBL 1 and an Age field of TBL 2, each of which has a numerical value as a character type, in addition, and has an identical average value, correspond to each other.

Patent document 1: JP-P2006-99236A

DISCLOSURE OF THE INVENTION

Problems to be Solved by the Invention

In such a conventional field collation system, with the case of the field of a category value in which the data is configured of only 0 and 1, for example, the gender field and the married/unmarried field, it is difficult to squeeze the corresponding fields into a limited number of the fields.

The reason is that these items of the data often have the identical feature. For example, the married field of TBL 1 of FIG. 3 is a field of which the data is 0 or 1, whereby the character type and the average value thereof become a numerical value and 0.5, respectively. As it is, each of a C1 field and a C2 field of TBL 2 becomes identical to the married field in the feature of the data because each is a field of which the data is 0 or 1, similarly, whereby the corresponding fields cannot be squeezed into a limited number of the fields. Likewise, with the gender field of TBL 1 as well, it is impossible to determine which field, out of the C1 field and the C2 field of TBL 2, the above field corresponds to.

Thereupon, the present invention has been accomplished in consideration of the above-mentioned problems, and an object thereof is to provide a technology capable of accurately grouping a correspondence of the field of the category in which the corresponding group is difficult to identify only with a feature of the data being included in the field.

Means to Solve the Problem

The present invention for solving the above-mentioned problems is a field collation method for grouping fields corresponding to each other between different tables, comprising: pre-storing a field group in which the fields corresponding to each other between the tables have been grouped; making a pair of a definite field that belongs to any field group, and an indefinite field that does not belong to any field group in each table, and calculating a correlation value between the definite field and the indefinite field of this pair; obtaining the pair in which the definite fields belong to the identical field group, out of the pairs in which said correlation value exceeds a predetermined threshold; and grouping the indefinite fields of the pair in which said definite fields belong to the identical field group as a new field group.

The present invention for solving the above-mentioned problems is a field collation system for grouping fields corresponding to each other between different tables, comprising: a field group storing means in which a field group in which the fields corresponding to each other between the tables have been grouped has been stored; a field correlation value calculating means for making a pair of a definite field that belongs to any field group, and an indefinite field that does not belong to any field group in each table, and calculating a correlation value between the definite field and the indefinite field of this pair; and a field group determining means for, based upon the field group stored in said field group storing means, obtaining the pair in which the definite fields belong to the identical field group, out of the pairs in which said correlation value exceeds a predetermined threshold, grouping the indefinite fields of this pair as a new field group, and registering it into said field group storing means.

The present invention for solving the above-mentioned problems is a field collation system for grouping fields corresponding to each other between different tables, comprising: a field group storing unit in which definite field information indicative of the field for which a correspondence has become definite in each table, and field group information indicative of a correspondence between said definite fields have been stored correspondingly to each other; a field correlation storing unit in which table information, indefinite field information, the definite field, and a correlation value between the indefinite field information and the definite field are stored correspondingly to each other; a field correlation value calculating means for, based upon the indefinite field information and the definite field information stored in said field group storing unit, calculating a correlation value between the indefinite field and the definite field information within the identical table, and storing a result in said field correlation storing unit; and a field group determining means for, out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering it into said field group storing means.

The present invention for solving the above-mentioned problems is a program of a field collation for causing an information processing device comprising a field group storing means in which a field group in which fields corresponding to each other between tables have been grouped has been stored to group the fields corresponding to each other between different tables, said program causing said information processing device to execute the processes of: making a pair of a definite field that belongs to any field group, and an indefinite field that does not belong to any field group in each table, and calculating a correlation value between the definite field and the indefinite field of this pair; and based upon the field group stored in said field group storing means, obtaining the pair in which the definite fields belong to the identical field group, out of the pairs in which said correlation value exceeds a predetermined threshold, grouping the indefinite fields of this pair as a new field group, and registering it into said field group storing means.

The present invention for solving the above-mentioned problems is a program of a field collation for causing an information processing device comprising: a field group storing unit in which definite field information indicative of fields for which a correspondence has become definite in each table, and field group information indicative of a correspondence between said definite fields have been stored correspondingly to each other; and a field correlation storing unit in which table information, indefinite field information, the definite field, and a correlation value between the indefinite field information and the definite field are stored correspondingly to each other to group the fields corresponding to each other between the different tables, said program causing said information processing device to execute the processes of: based upon the indefinite field information and the definite field information stored in said field group storing unit, calculating a correlation value between the indefinite field and the definite field information within the identical table, and storing a result in said field correlation storing unit; and out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering it in said field group storing means.

The present invention for solving the above-mentioned problems is a field collating device for employing a field group storing means in which a field group in which fields corresponding to each other between tables have been grouped has been stored, thereby to group the fields corresponding to each other between the different tables, said field collating device comprising: a field correlation value calculating means for, in each table, making a pair of a definite field that belongs to any field group, and an indefinite field that does not belong to any field group, and calculating a correlation value between the definite field and the indefinite field of this pair; and a field group determining means for, based upon the field group stored in said field group storing means, obtaining the pair in which the definite fields belongs to the identical field group, out of the pairs in which said correlation value exceeds a predetermined threshold, grouping the indefinite fields of this pair as a new field group, and registering it into said field group storing means.

The present invention for solving the above-mentioned problems is a field collating device for employing: a field group storing unit in which definite field information indicative of fields of which a correspondence has become definite in each table, and field group information indicative of a correspondence between said definite fields have been stored correspondingly to each other; and a field correlation storing unit in which table information, indefinite field information, the definite field, and a correlation value between the indefinite field information and the definite field are stored correspondingly to each other, thereby to group the fields corresponding to each other between the different tables, said field collating device comprising: a field correlation value calculating means for, based upon the indefinite field information and the definite field information stored in said field group storing unit, calculating a correlation value between the indefinite field and the definite field information within the identical table, and storing a result in said field correlation storing unit; and a field group determining means for, out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering it into said field group storing means.

An Advantageous Effect of the Invention

The present invention makes it possible to precisely group the fields of the category, which are difficult to group by specifying the corresponding field only with the feature being contained in the field. The reason is that the corresponding group is specified by employing the field for which a correspondence relation has become definite, and a correlation between the above field and the indefinite field.

BRIEF DESCRIPTION OF THE DRAWINGS

FIG. 3 is a view for explaining the prior art.
FIG. 7 is a view illustrating an example of a target database.
FIG. 8 is a view illustrating a store example of a field type storing unit 20.
FIG. 9 is a view illustrating a store example of a field correlation storing unit 21.
FIG. 10 is a view illustrating a store example of a field group storing unit 22.

FIG. 13 is a view illustrating an example in which the field group storing unit 22 of FIG. 11 has been displayed on an outputting device 5.

FIG. 14 is a view for explaining calculation of a correlation value of the field.

FIG. 15 is a view for explaining calculation of a correlation value of the field.

FIG. 16 is a view for explaining calculation of a correlation value of the field.

FIG. 17 is a view for explaining calculation of a correlation value of the field.

FIG. 18 is a view for explaining calculation of a correlation value of the field.

FIG. 19 is a view for explaining calculation of a correlation value of the field.

DESCRIPTION OF NUMERALS 1 data processing device
2 storing device
3 target database
4 inputting device
5 outputting device

BEST MODE FOR CARRYING OUT THE INVENTION

At first, an outline of the present invention will be explained.

Figure 4:
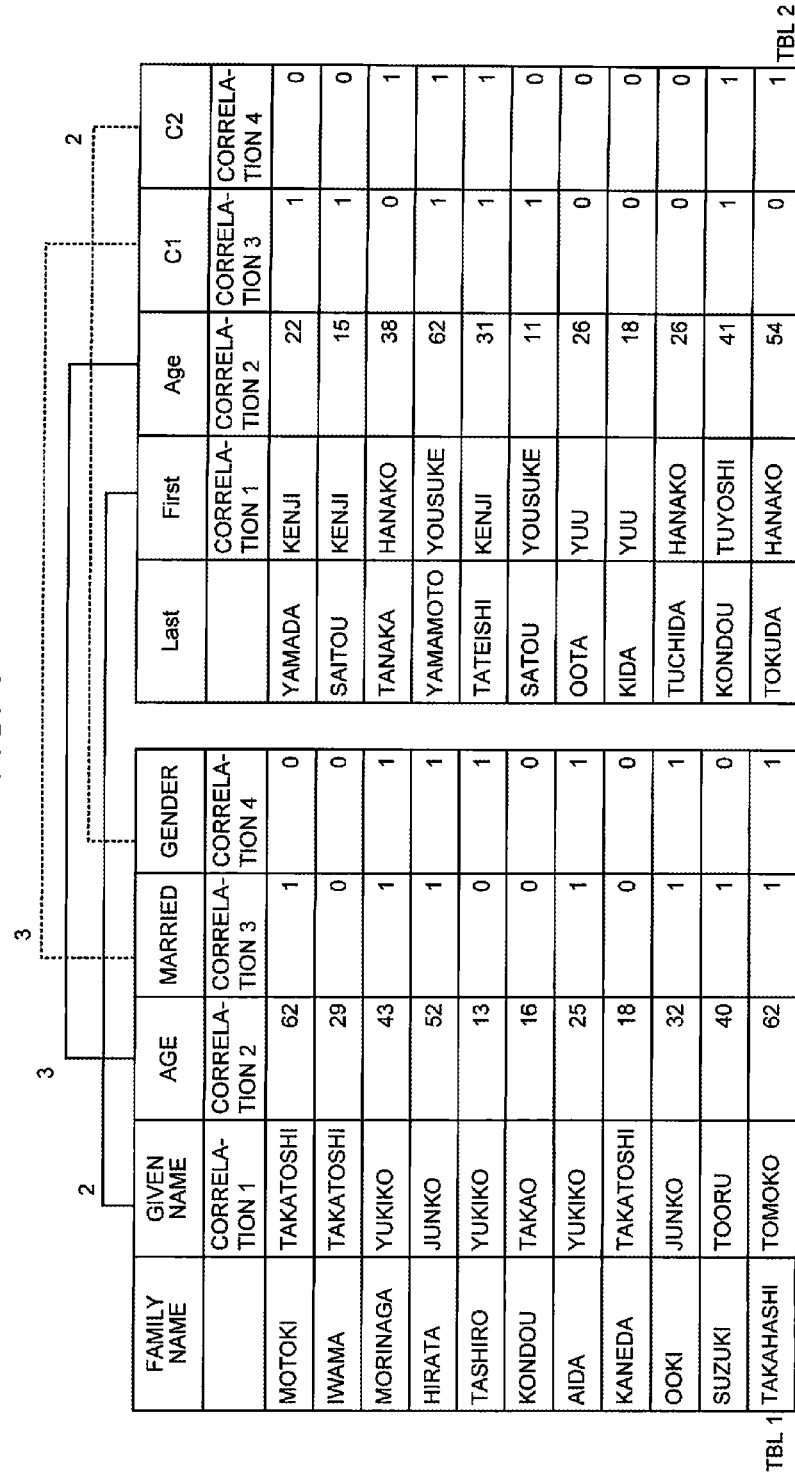
FIG. 4 is a view for explaining the present invention.

The present invention is characterized in grouping a corresponding field aggregation by employing a correlation of the field. As shown in FIG. 4, with the case of the field in which the data such as the gender and the married/unmarried is comprised only of 0 and 1, it is difficult to squeeze the corresponding fields into a limited number of the fields with the data as a clue. Herein, it can be safely said that there exists a correlation between the given name and the gender as apparent from the fact that, as a rule, a given name of "Kenji" is given to "male", and a given name of "Yukiko" is given to "female". Likewise, it can be safely said that there exists a correlation between the married and the age because the person gets married over a certain age in many cases.

Thereupon, in an example of FIG. 4, when it is known in advance that the given name field of TBL 1 and the First field of TBL 2 correspond to each other, and in addition, it is known that the given name field of TBL 1 and the gender field thereof have a correlation (correlation 1) with each other, and the First field of TBL 2 and the C2 field thereof have a correlation (correlation 1) with each other, it can be newly derived that the gender field of TBL 1 and the C2 field of TBL 2 correspond to each other as shown in FIG. 4.

Likewise, when it has been known in advance that the age field of TBL 1 and the Age field of TBL 2 correspond to each other, and in addition, it is known that the age field of TBL 1 and the married field thereof have a correlation (correlation 2) with each other, and that the Age field of TBL 2 and the C1 field thereof have a correlation (correlation 2) with each other, it can be newly derived that the married field of TBL 1 and the C1 field of TBL 2 correspond to each other as shown in FIG. 4.

The present invention is configured of two processes.

Figure 1:
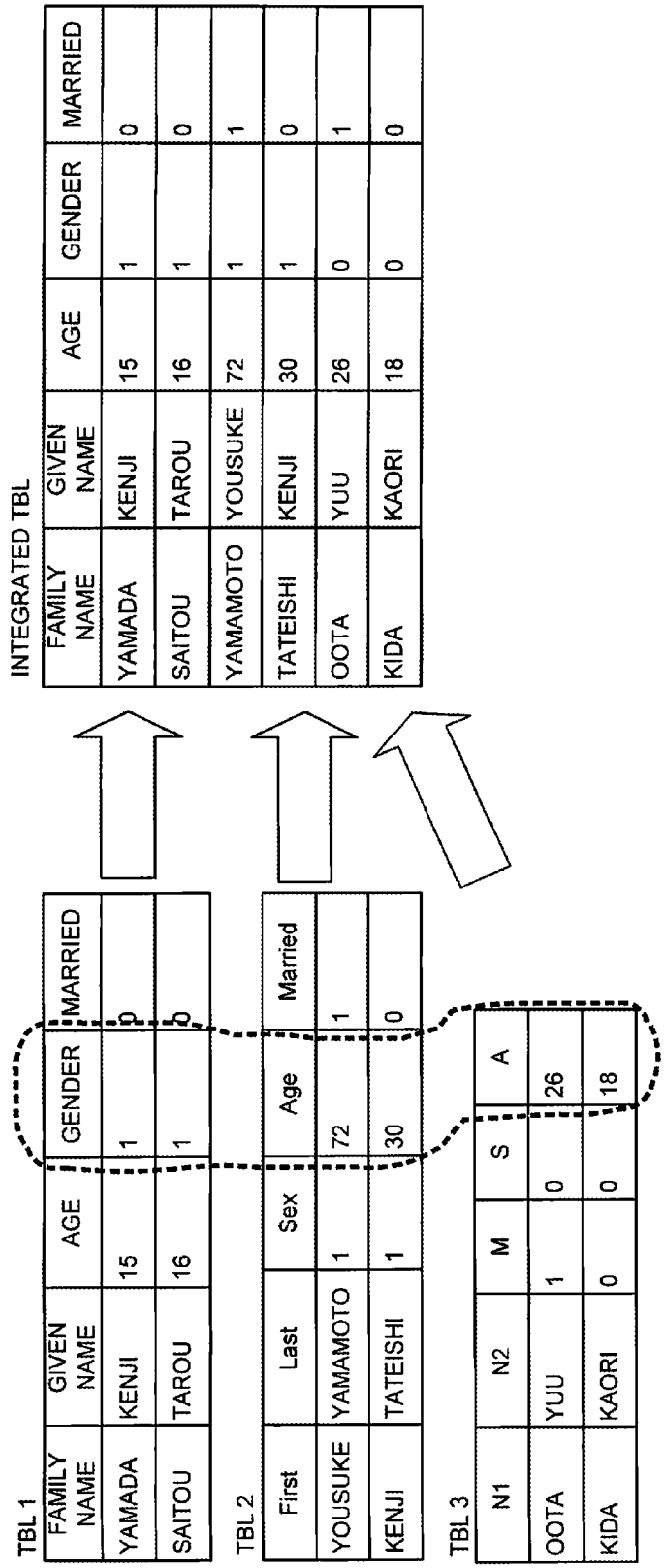
FIG. 1 is a view for explaining the prior art.
Figure 2:
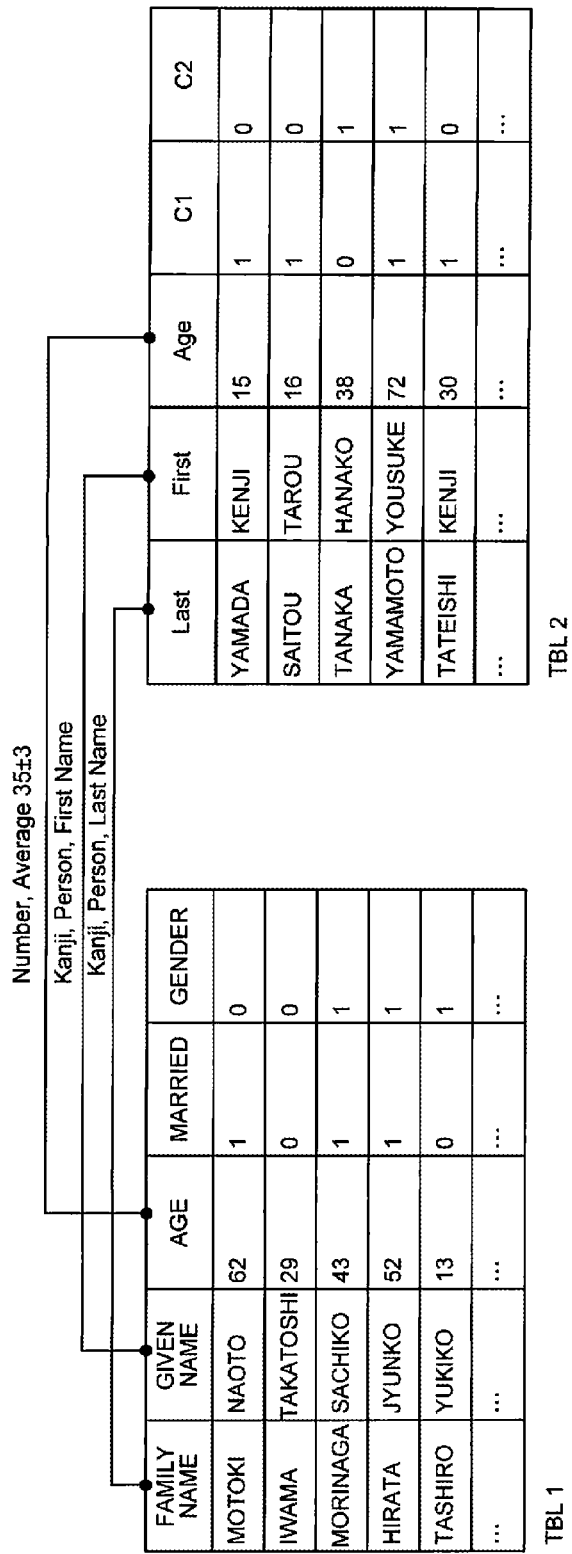
FIG. 2 is a view for explaining the prior art.

Herein, TBL 1 and TBL 2 of FIG. 4 are exemplified for explanation. The present invention premises the fact that the field group for which the correspondence has already become definite exists. Herein, it is assumed that three field groups between TBL 1 and TBL 2 of FIG. 4 have become definite. It is assumed that a group 1 is configured of the family name field of TBL 1 and the Last field of TBL 2, a group 2 is configured of the given name field of TBL 1 and the First field of TBL 2, and a group 3 is configured of the age field of TBL 1 and the Age field of TBL 2. Additionally, in FIG. 4, the field group can be detected by employing the prior art similarly to an example of FIG. 2.

At first, as a step 1, a value of a correlation between an indefinite field and a definite field within the identical table is calculated. Herein, the so-called definite field is a field that belongs to any field group, and the so-called indefinite field is a field that does not belong to any field group. For example, the definite fields of TBL 1 are the family name field, the given name field, and the age field, and the indefinite fields thereof are the gender field and the married field.

At this time, a field pair, being a combination of the definite field and the indefinite field, is decided, and a correlation value between the definite field and the indefinite field in each of these field pairs is calculated.

Figure 5:
FIG. 5 is a view for explaining the present invention.

In an example of TBL 1 of FIG. 5, six field pairs can be obtained from three definite fields and two indefinite fields, and the value of a correlation between the fields in each field pair is calculated. This value of a correlation is normalized by 0-1, and for example, the values as shown in the step 1 of FIG. 5 are obtained. Herein, the value of a correlation between the given name field and the gender field, and the value of a correlation between the age field and the married field are large. Also with TBL 2, likewise, the value of a correlation between the Age field and the C1 field, and the value of a correlation between the First field and the C2 field are large.

Next, as a step 2, out of an indefinite field aggregation of field pairs in which the value of a correlation is equal to or more a threshold, the indefinite field aggregation belonging to a field group identical to the field group, to which the definite field corresponding to this indefinite field aggregation belongs, is defined to be a new field group (see Step 2 of FIG. 5). That is, out of the field pair aggregation in which the value of a correlation is equal to or more than a threshold, the indefinite fields of the field pair aggregation belonging to a field group identical to the field group, to which the definite fields of the above field pair aggregation belong, are defined to be a new field group.

For example, when it is assumed that the threshold is 50%, the value of a correlation between the gender field of TBL 1 and the given name field thereof exceeds the threshold (a combination of the gender field of TBL 1 and the given name field thereof is defined to be a field pair 1). Further, the value of a correlation between the C2 field of TBL 2 and the First field thereof exceeds the threshold (a combination of the C2 field of TBL 2 and the First field thereof is defined to be a field pair 2).

Herein, the given name field, being a definite field of the field pair 1, belongs to the group 2, the First field as well, being a definite field of the field pair 2, belongs to the group 2, so both belong to the identical field group. Thereupon, the gender field of TBL 1, being an indefinite field of the field pair 1, and the C2 field of TBL 2, being an indefinite field of the field pair 2, are defined to be a new field group.

In other words, the given name field, being a definite field corresponding to the gender field of TBL 1, belongs to the group 2, and the First field, being a definite field corresponding to the C2 field of TBL 2, belongs to the group 2. And, it can be safely said that the gender field of TBL 1 and the C2 field of TBL 2 constitute a new field group.

Likewise, it is assumed that the married field of TBL 1 and the C1 field of TBL 2 constitute a new field group.

Next, the best mode for carrying out the present invention will be explained by making a reference to the accompanied drawings.

Figure 6:
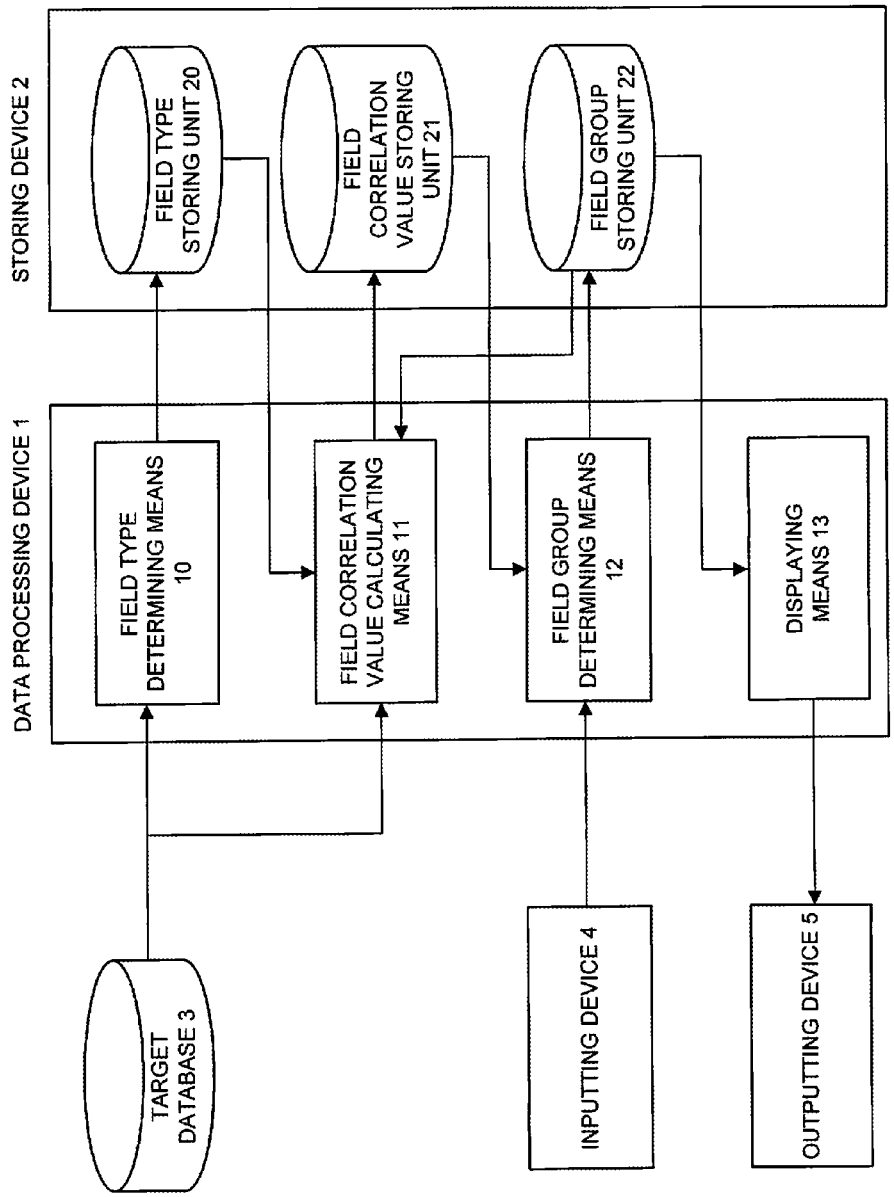
FIG. 6 is a block diagram of a first embodiment of the present invention.

Upon making a reference to FIG. 6, the embodiment of the present invention includes a data processing device 1 that operates under control of a program, a storing device 2 for storing information, a target database 3, an inputting device 4 such as a keyboard, and an outputting device 5 such as a display.

The target database 3, which is a so-called database, has a plurality of tables stored therein. An example of the target database is shown in FIG. 7.

The storing device 2 includes a field type storing unit 20, a field correlation value storing unit 21, and a field group storing unit 22. The storing device 2 is a magnetic medium such as HDD, or a memory.

The field type storing unit 20 has a correspondence relation between the field and a field type stored therein. A store example of the field type storing unit 20 is shown in FIG. 8.

The field correlation value storing unit 21 has the value of a correlation between the definite field and the indefinite field stored therein. A store example of the field correlation value storing unit 21 is shown in FIG. 9.

Figures 11, 12:
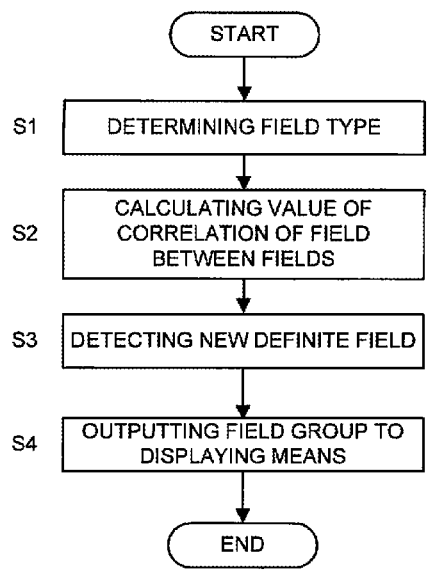
FIG. 11 is a view illustrating a store example of a field group storing unit 22.
FIG. 12 is a flowchart of an operation of the best mode for carrying out the invention.

The field group storing unit 22 has a relation of a predetermined field, a field group ID indicative of the field group to which this field belongs, and a field having a correlation with the above field stored therein. A store example of the field group storing unit 22 is shown in FIG. 10 and FIG. 11. The field to which the field group ID has been affixed is a definite field, and the field to which the field group ID has not been affixed signifies an indefinite field.

The data processing device 1 includes a field type determining means 10, a field correlation value calculating means 11, a field group determining means 12, and a displaying means 13.

The field type determining means 10 analyzes the data of respective fields of respective tables stored in the target database 3, determines the field type, and stores its result in the field type storing device 20. As a field type, there exist three kinds, i.e. a character string, a category, and a numerical value. An example in which a result of the field type determination carried out for the content of the target database of FIG. 7 by the field type determining means 10 has been stored in the field type storing unit 20 is shown in FIG. 8.

The field correlation value calculating means 11 calculates the value of a correlation between the indefinite field and the definite field stored in the field group storing unit 22 within the identical table (the value of a correlation of the field pair, being a combination of the indefinite field and the definite field) by making a reference to the target database 3, and registers its result into the field correlation storing unit 21. For the value of a correlation of the field, the calculation method that differs for each field type determined by the field type determining means 10 may be prepared. An example in which the value of a correlation calculated by the field correlation value calculating means 11 has been stored is shown in FIG. 9.

The field group determining means 12 obtains the field pairs in which the value of a correlation of the field stored in the field correlation value storing unit 21 is equal to or more than the predetermined threshold inputted from the inputting device 4. The field group determining means 12 obtains the field pair belonging to a field group identical to the field group, to which the definite fields corresponding to each other between the different tables belong, out of the field pairs in which the correlation value is equal to or more than the predetermined threshold. And, it groups the indefinite field aggregation of this field pair aggregation as a new definite field aggregation. In addition, the new definite field aggregation and the field aggregation in which the value of a correlation of the field is equal to more than the threshold are defined to be a correlation field aggregation. The new definite field aggregation and the correlation field aggregation are stored in the field group storing unit 22. An example of the field group storing unit 22, being a result of the process performed for the field correlation storing unit 21 of FIG. 9 and the field group storing unit 22 of FIG. 10 by the field group determining means 12, is shown in FIG. 11.

The displaying means 13 displays the definite field aggregation and its correlation field aggregation stored in the field group storing unit 22 on the outputting device 5.

Next, an operation of the best mode for carrying out the present invention will be explained in details by making a reference to FIG. 12.

Herein, the case that FIG. 7 is given as the target database 3, and FIG. 10 is given as the initial field group storing unit 22 is exemplified for explanation. That is, while each of two tables of the target database 3 is configured of five fields, and three fields, out of them, are in a situation where the correspondence thereof has already become definite. The group 1 is configured of the family name field of TBL 1 and the Last field of TBL 2, the group 2 is configured of the given name field of TBL 1 and the First field of TBL 2, and the group 3 is configured of the age field of TBL 1 and the Age field of TBL 2.

Further, the explanation is made on the assumption that 0.5 has been given as a threshold of the correlation value by the inputting device 4.

At first, the field type determining means 10 analyzes the data of respective fields of respective tables stored in the target database 3, determines the field type, and stores its result in the field type storing device 20 (step S1 of FIG. 12).

Additionally, herein, the field type is explained as three kinds, i.e. a character string, a category, and a numerical value. Further, the field type can be automatically determined as described below. At first, the data of the field is analyzed, and a character type of the data and cardinality (number of distinct elements) of the data are investigated. When the cardinality of the data is two or less, the field type is defined to be a category. Additionally, this value of two is only one example, and the value is not limited hereto. When the cardinality of the data is more than two, and yet the character type of the data is a numerical value, the field type is defined to be a numerical value. When the cardinality of the data is more than two, and yet the character type of the data is a type other than the numerical value, the field type is defined to be a character string. A store example of the field type storing unit 20, being a result obtained by employing this determination method to determine the individual fields of the target database 3 of FIG. 8, is shown in FIG. 9. Additionally, while the field type is automatically determined herein, the method in which a user inputs the field type may be employed.

Next, the field correlation value calculating means 11 calculates the value of a correlation between the indefinite field and the definite field stored in the field group storing unit 22 within the identical table by making a reference to the target database 3, and registers its result into the field correlation value storing unit 21 (step S2 of FIG. 12).

For example, with TBL 1, in a store example of the field group storing unit 22 shown in FIG. 10, the definite fields are the family name field, the given name field, and the age field. On the other hand, the indefinite fields are the married field and the gender field of TBL 1. Thus, with TBL 1, the number of combinations of the value of a correlation between the indefinite field and the definite field is six. With TBL 2 as well, likewise, the number of combinations is six. Herein, for the value of a correlation between the fields, the calculation method that differs responding to the field type determined by the field type determining means 10 is prepared. The specific method of calculating the value of a correlation between two fields will be later described. An example in which the value of a correlation calculated by the field correlation value calculating means 11 has been stored is shown in FIG. 9.

Next, the field group determining means 12 obtains the definite field aggregation belonging to the identical field group, out of the field pair aggregation in which the value of a correlation of the field stored in the field correlation value storing unit 21 is equal to or more than the threshold inputted from the inputting device 4, by making a reference to information stored in the field group storing unit 22. And, it obtains the indefinite field aggregation corresponding to this definite field aggregation, and defines the above indefinite field aggregation to be a new definite field aggregation. And, it defines the new definite field aggregation and the field aggregation in which the value of a correlation of the field is equal to or more than the threshold to be a correlation field aggregation. The new definite field aggregation and the correlation field aggregation are stored in the field group storing unit 22 (step S3 of FIG. 12).

For example, it is in the field pair 1, being a combination of the married field and the age field of TBL 1, and in the field pair 2, being a combination of the gender field and the given name field of TBL 1, that the value of a correlation is 0.5 or more in the field correlation storing unit 21 of FIG. 9. Each of the married field and the gender field is an indefinite field, and each of the age field and the given name field is a definite field.

Further, it is in a field pair 3, being a combination of the C1 field and the First field of TBL 2, and in a field pair 4, being a combination of the C2 field and the Age field of TBL 2, that the value of a correlation is 0.5 or more. Each of the C1 field and the C2 field is an indefinite field, and each of the First field and the Age field is a definite field.

On the other hand, in a store example of FIG. 10 in the field group storing unit 22, each of the age field, being a definite field of the field pair 1, and the Age field, being a definite field of the field pair 4, belong to the identical field group. Further, each of the given name field, being a definite field of the field pair 2, and the First field, being a definite field of the field pair 3, belong to the identical field group.

From now on, the married field, being an indefinite field of the field pair 1, and the C2 field, being an indefinite field of the field pair 4, become a new definite field, and are given a new field group ID (field group ID=4), respectively. In addition, the age field and the married field become a correlation field, and the Age field and the C2 field become a correlation field, respectively.

Likewise, the gender field, being an indefinite field, and the C1 field, being an indefinite field, become a new definite field, and are given a new field group ID (field group ID=5), respectively. In addition, the given name field and the gender field become a correlation field, and the First field and the C1 field become a correlation field, respectively.

As a result above, the field group storing unit 22 is changed as shown in FIG. 11.

Next, the displaying means 13 displays the definite field aggregation and its correlation field aggregation stored in the field group storing unit 22 on the outputting device 5 (step S4 of FIG. 12).

An example in which the field group storing unit 22 of FIG. 11 has been displayed on the outputting device 5 is shown in FIG. 13. In this display example, the new definite field aggregation is connected by use of a solid line. Further, the correlation fields of the definite field aggregation are classified by adding "correlation+figure" to a head of each field. For example, it can be seen that each of the married field and the C2 field is a new definite field, the correlation field of the married field is the age field of "correlation 2", and the correlation field of the C2 field is the Age field of "correlation 2". Displaying the correlation fields together in such a manner enables a user to understand which determination has been made for detecting the new definite fields by the system.

Next, the method of calculating the value of a correlation between two fields by the field correlation value calculating means 11 will be explained.

The field correlation value calculating means 11 employs the calculation method that differs responding to a combination of the field types of two fields. As a field type, there exist three kinds, i.e. the numerical value, the character string, and the category. An object of the present invention is to detect a correspondence of the field of category value, so the field type of one field becomes a category. And, the field type of the other field becomes a numerical value, a character string, or a category. Thus, as a method of calculating the value of a correlation between the fields, there exist the following three methods:

(1) When the field types are a category and a category, respectively (2) When the field types are a category and a numerical value, respectively (3) When the field types are a category and a character string, respectively Additionally, as the prior art, there exists the method of calculating a correlation coefficient; however, the other techniques need to be employed herein because this method premises the fact that the field types are a numerical value and a numerical value, respectively.

(1) When the Field Types are a Category and a Category, Respectively

The value of a correlation between a field F1 and a field F2 is calculated with FIG. 14 as an example.

At first, an information quantity of F1, an information quantity of F2, and an information quantity of F1 and F2 are calculated. Log2 designates the logarithm function to the base 2.

$$H(F1) = \Sigma\_x \in F1 - P(x) * \log 2P(x)$$

$$H(F2) = \Sigma\_x \in F2 - P(x) * \log 2P(x)$$

$$H(F1\&F2) = \Sigma\_x \in F1 \Sigma\_y \in F2 - P(x \wedge y) * \log 2P(x \wedge y)$$

P(x)=(the number of the records of which the value is x)/(the total number of the records being contained in the field)

Upon making explanation with an example of FIG. 14, the total number of the records is 10, and out of them, the number of the records of which the value of F1 is 0 (zero) is two, whereby P(0)=0.2, the number of the records of which the value is 1 is three, whereby P(1)=0.3, the number of the records of which the value is 2 is three, whereby P(2)=0.3, and the number of the records of which the value is 3 is two, whereby P(3)=0.2. Thus, H(F1)=−0.2*log 2 0.2−0.3*log 2 0.3−0.3*log 2 0.3−0.2*log 2 0.2=1.97 is yielded. The calculation of H(F2) and H(H1&H2) is also shown in FIG. 14.

At this time, the value of a correlation between F1 and F2 is obtained with the following equation.

The value of a correlation between F1 and F2=(H(F1)+H(F2)−H(F1,F2))/(H(F1)+H(F2)−max(H(F1),H(F2)))

H(F1)=1.97, H(F2)=1, and H(F1&F2)=1.97 in an example of FIG. 14, whereby the value of a correlation between F1 and F2=(1.97+1−1.97)/(1.97+1−1.97)=1 is yielded.

Herein, the so-called information quantity signifies a dispersion of the data, namely, the bigger the value is, the more a dispersion of the data is, and the smaller the value is, the less a dispersion of the data is, which means that many pieces of the data having the identical value exist.

The intuitive understanding of the calculation of the value of a correlation is as follows.

When it is assumed that F1 and F2 have no correlation with each other, and are completely independent, a dispersion of the data of F1 &F2 becomes a sum of a dispersion of F1 and a dispersion of F2. In the above-mentioned case, H(F1)+H(F2)=2.97. The actual dispersion of the data of F1 &F2 is 1.97. 1 obtained by subtracting 1.97 from this 2.97 becomes a value of a correlation between F1 and F2. Herein, the maximum value of a dispersion of the data of F1 &F2 is H(F1)+H(F2)=2.97, and the minimum value is max(H(F1),H(F2))=1.97. Thus, the value of a correlation is divided by H(F1)+H(F2)−max (H(F1),H(F2)) when it is normalized by a value of 0-1.

(2) When the Field Types are a Category and a Numerical Value, Respectively

The value of a correlation between F1 of which the field type is a numerical value and F2 of which the field type is a category is calculated with FIG. 15 as an example.

At first, the records are sampled/converted based upon the value of F1. An average value Ave(F1) and a standard deviation STDEV(F1) of F1 are obtained, the records in which the value of F1 is larger than Ave(F1)+STDEV(F1), and the records in which the value of F1 is smaller than Ave(F1)+STDEV(F1) are sampled. In addition, the value larger than Ave(F1)+STDEV(F1) is converted to 1, and the value smaller than Ave(F1)+STDEV(F1) is converted to 0.

In an example of FIG. 15, the average value is Ave(F1)=35.63636, and the standard deviation is STDEV(F1)=17.63674. Thus, the records in which the value of F1 is larger than 53.27310, and the records in which the value of F1 is smaller than 17.63674 are sampled. Further, the value of F1 larger than 53.27310 is converted to 1, and the value of F1 smaller than 17.63674 is converted to 0.

Next, the value of a correlation between F1 and F2 is calculated for the sampled/converted records with a method identical to that of (1). With the sampled/converted record, the calculation thereof becomes identical to the calculation of the value of a correlation in the case of the category and the category because the category value of F1 has been converted. The value of a correlation between F1 and F2 calculated for the record sampled/converted in an example of FIG. 15 becomes 1.

(3) When the Field Types are a Category and a Character String, Respectively

The value of a correlation between F1 of which the field type is a character string and F2 of which the field type is a category is calculated with FIG. 16 as an example.

At first, the records are sampled based upon the value of F1. An appearance frequency of the value of F1 is obtained, and the records of which the number exceeds 30% of the entirety are sampled in the descending order of the appearance frequency. However, when the appearance frequency becomes 1 before the number of sampled records reaches 30%, the value of a correlation between F1 and F2 is defined to be 0. Additionally, this 30% is only one example, and the number of sampled records is not always limited to this value.

In an example of FIG. 16, at first, the record of Takatoshi", of which the appearance frequency is largest, namely, of which the number of the appearances is three, is sampled. Additionally, "Yukiko" may be sampled in the first place because the number of the appearances thereof is also three. While the sampling number is three at this stage, the sampling number does not reach 30% yet because the total number of the records is 11. For this, the next "Yukiko" is sampled. The sampling number becomes six at this stage, and the sampling number exceeds 30%, so the sampling is finished herein.

Next, the value of a correlation between F1 and F2 is calculated for the sampled record with a method identical to that of (1). When F1 is interpreted as the identical category value of the identical character string, the above calculation performed for the sampled record becomes identical to the calculation of the value of a correlation in the case of the category and the category. The value of a correlation between F1 and F2 calculated for the record sampled in an example of FIG. 16 becomes 1.

The above-mentioned technique is effective in the case of calculating the value of a correlation, for example, between the "given name" and the "gender" fields. However, when "the family name+the given name" are stored in one field like the case of F1 of FIG. 17($a$), it follows that a correlation with the F2 "gender" is becomes 0. In such a case, when the data of F1 is divided into words by employing a morphological analysis, each record is divided into a plurality of the records for each word of F1 like the case of FIG. 17($b$), and then the above-mentioned technique is executed, the value of a correlation between F1 and F2 becomes 0.69, and the above technique is operatable also in the case that a correlation exists in one part of the character string.

Above, the method of calculating the value of a correlation between two fields by the record correlation value calculating means 11 was explained. The present invention, which has an object of detecting a correspondence of the field of the category value, is also applicable to the case of detecting a correspondence of the field of the numerical value and the field of the character string other than it. The method of calculating the value of a correlation of the record in this case will be described below.

(4) When the Field Types are a Character String and a Numerical Value, Respectively The value of a correlation between F1 of which the field type is a character string and F2 of which the field type is a numerical value is calculated.

At first, the records are sampled based upon the value of F1. A sampling method is similar to that of (3).

Next, the records sampled based upon the value of F1 are furthermore sampled/converted based upon the value of F2. A sampling/converting method is similar to that of (2).

Next, for the records sampled so far, the value of a correlation between F1 and F2 is calculated with a method identical to that of (1).

Additionally, in the foregoing, after sampling the records based upon F1, the records were sampled/converted based upon F2; however, contrarily, after sampling/converting the records based upon F2, the records may be sampled based upon F1.

(5) When the Field Types are a Character String and a Character String, Respectively At first, the records are sampled based upon the value of F1. A sampling method is similar to that of (3).

Next, the records sampled based upon the value of F1 are furthermore sampled based upon the value of F2. A sampling method is similar to that of (3).

Next, for the records sampled so far, the value of a correlation between F1 and F2 is calculated with a method identical to that of (1).

Additionally, in the foregoing, after sampling the records based upon F1, the records were sampled based upon F2; however, contrarily, after sampling the records based upon F2, the records may be sampled based upon F1.

(6) When the Field Types are a Numerical Value and a Numerical Value, Respectively The value of a correlation between the field F1 and the field F2 is calculated with FIG. 18 as an example. Additionally, the calculation below is identical to the calculation of the correlation coefficient.

At first, the average value Ave(F1) of the values of F1 and the average value Ave(F2) of the values of F2 are obtained. In an example of FIG. 18, Ave(F1)=4.5 and Ave(F2)=14.5.

Next, each value of F1 is converted into a value obtained by subtracting Ave(F1) from the above value, and each value of F2 is converted into a value obtained by subtracting Ave(F2) from the above value.

Next, the value of a correlation between F1 and F2 is calculated as an absolute value of cosine(F1,F2). Cosine(F1, F2) can be obtained with the following equation. $F1(r)$ and $F2(r)$ are a value of F1 and F2 in a record r, respectively.

$$cosine(F1,F2)=\Sigma r\epsilon F1,F2 F1(r)*F2(r)/\sqrt{(\Sigma r\epsilon F1 F1(r)^2)}*\sqrt{(\Sigma r\epsilon F2 F2(r)^2)}$$

In an example of FIG. 18, $$cosine(F1,F2)=(-4.5*-4.5)+(-3.5*-3.5)+(-2.5*-2.5)+\ldots+(4.5*4.5)/\sqrt{((-4.5)^2+(-3.5)^2+(-2.5)^2+\ldots+(4.5)^2}*\sqrt{((-4.5)^2+(-3.5)^2+(-2.5)^2+\ldots+(4.5)^2}=1$$

is yielded.

Above, an operation of the embodiment was explained.

While the field correlation value calculating means 11 of the foregoing embodiment composes one field pair from one definite field and one indefinite field, and calculates the value of a correlation between one definite field and one indefinite field, it may be adapted to compose one field pair from a plurality of definite fields and one indefinite field, thereby to calculate the value of a correlation between a plurality of definite fields and one indefinite field.

For example, FIG. 19 shows an example in which the value of a correlation between two definite fields F11 and F12, and one indefinite field F2 has been calculated. It can be seen that replacing F1 with F11&F12 in the calculation method previously explained in FIG. 14 makes it possible to calculate the value of a correlation with the similar method. In an example of FIG. 19, while the value of a correlation between F11 and F2, and the value of a correlation between F11 and F2 are low, the value of a correlation between F11 &F12 and F2 becomes high, i.e. 1. Calculating the value of a correlation with a plurality of the definite fields in such a manner makes it possible to detect the new definite field.

While an example of FIG. 19 premises the fact that the field type of both of the definite field and the indefinite field is a category, the value of a correlation can be calculated by employing the methods of FIG. 16 and FIG. 18 also in the case that the field type of either field is a numerical value or a character string. For example, when the field types of F11, F12, and F2 are a character string, a numerical value, and a category, respectively, the value of a correlation between F11&F12 and F2 is calculated by employing an intersection of the records other than the records sampled based upon the value of F11 with the method explained in FIG. 16, and the records other than the records sampled based upon the value of F12 with the method explained in FIG. 18.

When the field correlation value calculating means 11 has calculated the value of a correlation between a plurality of definite fields and one indefinite field, the field group determining means, out of the indefinite field aggregation in which the value of a correlation between a certain plurality of the definite fields and the field stored in the field correlation value storing unit is equal to or more than a pre-set threshold, defines the indefinite field aggregation belonging to a field group identical to the field group stored in the field group storing unit, to which each of the above plurality of the definite fields belongs, to be a new definite field.

For example, when the value of a correlation between the given name field & the age field each of which is a definite field of TBL 1, and the married field, being an indefinite field, is equal to or more than the threshold, and yet the value of a correlation between the Last field & the Age field each of which is a definite field of TBL 2, and the C2 field, being an indefinite field, is equal to or more than the threshold in the target database 3 of FIG. 3 and the field group storing unit 22 of FIG. 10, the field group determining means defines each of the married field and the C2 field to be a new definite field because the given name field and the Last field belong to the identical field group, and yet the age field and the Age field belong to the identical field group.

The 1st present invention is a field collation method for grouping fields corresponding to each other between different tables, comprising: pre-storing a field group in which the fields corresponding to each other between the tables have been grouped; making a pair of a definite field that belongs to any field group, and an indefinite field that does not belong to any field group in each table, and calculating a correlation value between the definite field and the indefinite field of this pair; obtaining the pair in which the definite fields belong to the identical field group, out of the pairs in which said correlation value exceeds a predetermined threshold; and grouping the indefinite fields of the pair in which said definite fields belong to the identical field group as a new field group.

Also, in the above-mentioned present invention, the 2nd present invention further comprises employing a calculation method that differs responding to a field type when the correlation value of the two fields is calculated.

Also, in the above-mentioned present invention, the 3rd present invention further comprises displaying a correspondence relation of the fields grouped as a new field group.

Also, in the above-mentioned present invention, the 4th present invention further comprises displaying a correlation of the fields in which the correlation value with the field grouped as a new field group is equal to or more than a predetermined threshold.

Also, in the above-mentioned present invention, the 5th present invention comprises: composing a pair from a plurality of definite fields and one indefinite field; calculating the correlation value between said plurality of said definite fields and said one indefinite field; obtaining the pair in which said plurality of said definite fields belong to the identical field group, out of the pairs in which said correlation value exceeds a predetermined threshold; and grouping the indefinite fields of the pair in which said definite fields belong to the identical field group as a new field group.

Also, the 6th present invention is a field collation system for grouping fields corresponding to each other between different tables, comprising: a field group storing means in which a field group in which the fields corresponding to each other between the tables have been grouped has been stored; a field correlation value calculating means for making a pair of a definite field that belongs to any field group, and an indefinite field that does not belong to any field group in each table, and calculating a correlation value between the definite field and the indefinite field of this pair; and a field group determining means for, based upon the field group stored in said field group storing means, obtaining the pair in which the definite fields belong to the identical field group, out of the pairs in which said correlation value exceeds a predetermined threshold, grouping the indefinite fields of this pair as a new field group, and registering it into said field group storing means.

Also, the 7th present invention is a field collation system for grouping fields corresponding to each other between different tables, comprising: a field group storing unit in which definite field information indicative of the field for which a correspondence has become definite in each table, and field group information indicative of a correspondence between said definite fields have been stored correspondingly to each other; a field correlation storing unit in which table information, indefinite field information, the definite field, and a correlation value between the indefinite field information and the definite field are stored correspondingly to each other; a field correlation value calculating means for, based upon the indefinite field information and the definite field information stored in said field group storing unit, calculating a correlation value between the indefinite field and the definite field information within the identical table, and storing a result in said field correlation storing unit; and a field group determining means for, out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering it into said field group storing means.

Also, in the above-mentioned present invention, the 8th present invention is characterized in that said field correlation value calculating means, when calculating the correlation value of the two fields, employs a calculation method that differs responding to a field type.

Also, in the above-mentioned present invention, the 9th present invention comprises a displaying means for displaying a correspondence relation of the fields grouped as a new field group.

Also, in the above-mentioned present invention, the 10th present invention comprises a displaying means for displaying a correlation of the fields in which the correlation value with the field grouped as a new field group is equal to or more than a predetermined threshold.

Also, in the above-mentioned present invention, the 11th present invention is characterized in that said field correlation value calculating means calculates the correlation value between a plurality of the definite fields, and the one indefinite field; and wherein said field group determining means obtains the pair in which said plurality of said definite fields belong to the identical field group, out of the pairs in which said correlation value exceeds a predetermined threshold, and groups the indefinite fields of the pair in which said definite fields belong to the identical field group as a new field group.

Also, in the above-mentioned present invention, the 12th present invention is characterized in that said field correlation value calculating means calculates the correlation value between a plurality of the definite fields and the one indefinite field; and wherein said field group determining means, out of the indefinite field aggregation in which said correlation value is equal to or more than a predetermined threshold, determines the indefinite fields belonging to a field group identical to the field group, to which each of a plurality of the definite fields corresponding to the above indefinite field belongs, based upon said field group information, groups these indefinite fields as a new field group, and registers it into said field group storing means.

Also, the 13th present invention is a program of a field collation for causing an information processing device comprising a field group storing means in which a field group in which fields corresponding to each other between tables have been grouped has been stored to group the fields corresponding to each other between different tables, said program causing said information processing device to execute the processes of: making a pair of a definite field that belongs to any field group, and an indefinite field that does not belong to any field group in each table, and calculating a correlation value between the definite field and the indefinite field of this pair; and based upon the field group stored in said field group storing means, obtaining the pair in which the definite fields belong to the identical field group, out of the pairs in which said correlation value exceeds a predetermined threshold, grouping the indefinite fields of this pair as a new field group, and registering it into said field group storing means.

Also, the 14th present invention is a program of a field collation for causing an information processing device comprising: a field group storing unit in which definite field information indicative of fields for which a correspondence has become definite in each table, and field group information indicative of a correspondence between said definite fields have been stored correspondingly to each other; and a field correlation storing unit in which table information, indefinite field information, the definite field, and a correlation value between the indefinite field information and the definite field are stored correspondingly to each other to group the fields corresponding to each other between the different tables, said program causing said information processing device to execute the processes of: based upon the indefinite field information and the definite field information stored in said field group storing unit, calculating a correlation value between the indefinite field and the definite field information within the identical table, and storing a result in said field correlation storing unit; and out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering it in said field group storing means.

Also, the 15th present invention is a field collating device for employing a field group storing means in which a field group in which fields corresponding to each other between tables have been grouped has been stored, thereby to group the fields corresponding to each other between the different tables, said field collating device comprising: a field correlation value calculating means for, in each table, making a pair of a definite field that belongs to any field group, and an indefinite field that does not belong to any field group, and calculating a correlation value between the definite field and the indefinite field of this pair; and a field group determining means for, based upon the field group stored in said field group storing means, obtaining the pair in which the definite fields belongs to the identical field group, out of the pairs in which said correlation value exceeds a predetermined threshold, grouping the indefinite fields of this pair as a new field group, and registering it into said field group storing means.

Also, the 16th present invention is a field collating device for employing: a field group storing unit in which definite field information indicative of fields of which a correspondence has become definite in each table, and field group information indicative of a correspondence between said definite fields have been stored correspondingly to each other; and a field correlation storing unit in which table information, indefinite field information, the definite field, and a correlation value between the indefinite field information and the definite field are stored correspondingly to each other, thereby to group the fields corresponding to each other between the different tables, said field collating device comprising: a field correlation value calculating means for, based upon the indefinite field information and the definite field information stored in said field group storing unit, calculating a correlation value between the indefinite field and the definite field information within the identical table, and storing a result in said field correlation storing unit; and a field group determining means for, out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering it into said field group storing means.

Also, in the above-mentioned present invention, the 17th present invention is characterized in that said field correlation value calculating means, when calculating the correlation value between the two fields, employs a calculation method that differs responding to a field type.

Also, in the above-mentioned present invention, the 18th present invention comprises a displaying means for displaying a correspondence relation of the fields grouped as a new field group.

Also, in the above-mentioned present invention, the 18th present invention comprises a displaying means for displaying a correlation of the fields in which the correlation value with the field grouped as a new field group is equal to or more than a predetermined threshold.

Also, in the above-mentioned present invention, the 20th present invention is characterized in that said field correlation value calculating means calculates a correlation value between a plurality of definite fields, and one indefinite field; and wherein said field group determining means obtains the pair in which said plurality of said definite fields belong to the identical field group, out of the pairs in which said correlation value exceeds a predetermined threshold, and groups the indefinite fields of the pair in which said definite fields belong to the identical field group as a new field group.

Also, in the above-mentioned present invention, the 21th present invention is characterized in that said field correlation value calculating means calculates a correlation value between a plurality of the definite fields and the one indefinite field; and wherein said field group determining means, out of the indefinite field aggregation in which said correlation value is equal to or more than a predetermined threshold, determines the indefinite fields belonging to a field group identical to the field group, to which each of a plurality of the definite fields corresponding to the above indefinite field belongs, based upon said field group information, groups these indefinite fields as a new field group, and registers it into said field group storing means.

[How the Invention is Capable of Industrial Exploitation]

The field collation system of the present invention is utilizable for causing the field names to correspond to each other at the moment of integrating different tables of the large-scale database. Integrating the tables enables a search striding over a plurality of the tables to be carried out.

The invention claimed is:

1. A field collation method for grouping fields corresponding to each other between different tables, comprising:
    pre-storing a field group in which the fields corresponding to each other between different tables have been grouped;
    making a pair of a definite field and an indefinite field within an identical table, in each table, and calculating a correlation value between the definite field and the indefinite field of said pair, wherein said definite field belong s to an field group and said indefinite field does not belong to an field group;
    obtaining the pair in which the definite fields belong to the identical field group, out of the pairs in which said correlation value exceeds a predetermined threshold in the tables; and
    grouping the indefinite fields of said pairs in which said definite fields belong to the identical field group as a new field group.

2. A field collation method according to claim 1, further comprising employing calculation methods that differs responding to a combination of the field types of two fields when the correlation value of the two fields is calculated, wherein said calculation methods include a first calculation method when the field types are a category and a category, a second calculation method when the field types are a category and a numerical value, and a third calculation method when the field types area category and a character string.

3. A field collation method according to claim 1, further comprising displaying a correspondence relation of the fields grouped as a new field group.

4. A field collation method according to claim 1, further comprising displaying a correlation of the fields in which the correlation value with the field grouped as a new field group is equal to or more than a predetermined threshold.

5. A field collation method according to claim 1, comprising:
    composing a pair from a plurality of definite fields and one indefinite field;
    calculating the correlation value between said plurality of said definite fields and said one indefinite field;
    obtaining the pair in which said plurality of said definite fields belong to the identical field group, out of the pairs in which said correlation value exceeds a predetermined threshold; and
    grouping the indefinite fields of the pair in which said definite fields belong to the identical field group as a new field group.

6. A field collation system for grouping fields corresponding to each other between different tables, comprising:
    hardware, including a processor;
    a field group storage in which a field group in which the fields corresponding to each other between different tables have been grouped has been stored;
    a field correlation value calculator implemented at least by the hardware for making a pair of a definite field and an indefinite field within an identical table, in each table, and calculating a correlation value between the definite field and the indefinite field of said pair, wherein said definite field belongs to any field group and said indefinite field does not belong to any field group; and a field group determining unit implemented at least by the hardware for, based upon the field group stored in said field group storage, obtaining the pair in which the definite fields belong to the identical field group, out of the pairs in which said correlation value exceeds a predetermined threshold in the tables, grouping the indefinite fields of said pairs as a new field group, and registering it into said field group storage.

7. A field collation system for grouping fields corresponding to each other between different tables, comprising:

hardware, including a processor;

a field group storing unit, implemented at least by the hardware, in which table information for identifying a table, field information for identifying fields in the above table, and field group information indicative of a definite field for which a correspondence has become definite between the tables, out of the fields in the above table, and a correspondence between said definite fields have been stored correspondingly to each other;

a field correlation storing unit, implemented at least by the hardware, in which said table information, indefinite field information for identifying an indefinite field for which a correspondence is indefinite between the tables, out of the fields in the table of said table information, the definite field information of the definite field, out of the fields in the table of said table information, and a correlation value between said indefinite field and said definite field are stored correspondingly to each other;

a field correlation value calculator, implemented at least by the hardware, for, based upon said table information, said field information, and said field group information stored in said field group storing unit, calculating a correlation value between the indefinite field and the definite field information within the identical table, and storing a result in said field correlation storing unit; and a field group determining unit, implemented at least by the hardware, for, out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering the field group information of the above group into said field group storage so that it corresponds to the field information of the indefinite fields of the new field group.

8. A field collation system according to claim 6, wherein said field correlation value calculator, when calculating the correlation value of the two fields, employs a calculation methods that differs responding to a combination of the field types of the two fields, wherein said calculation methods include a first calculation method when the field types are a category and a category, a second calculation method when the field types are a category and a numerical value, and a third calculation method when the field types are a category and a character string.

9. A field collation system according to claim 6, comprising a displaying controller for displaying a correspondence relation of the fields grouped as a new field group.

10. A field collation system according to claim 6, comprising a displaying controller for displaying a correlation of the fields in which the correlation value with the field grouped as a new field group is equal to or more than a predetermined threshold.

11. A field collation system according to claim 6, wherein said field correlation value calculator calculates the correlation value between a plurality of the definite fields, and the one indefinite field; and wherein said field group determining unit obtains the pair in which said plurality of said definite fields belong to the identical field group, out of the pairs in which said correlation value exceeds a predetermined threshold, and groups the indefinite fields of the pair in which said definite fields belong to the identical field group as a new field group.

12. A field collation system according to claim 6, wherein said field correlation value calculator calculates the correlation value between a plurality of the definite fields and the one indefinite field; and wherein said field group determining unit, out of the indefinite field aggregation in which said correlation value is equal to or more than a predetermined threshold, determines the indefinite fields belonging to a field group identical to the field group, to which each of a plurality of the definite fields corresponding to the above indefinite field belongs, based upon said field group information, groups these indefinite fields as a new field group, and registers it into said field group storage.

13. A non-transitory recording medium stored a program of a field collation for causing an information processing device comprising a field group storage in which a field group in which fields corresponding to each other between tables have been grouped has been stored to group the fields corresponding to each other between different tables, said program causing said information processing device to execute the processes of:

making a pair of a definite field and an indefinite field within an identical table, in each table, and calculating a correlation value between the definite field and the indefinite field of said pair, wherein said definite field belongs to an field group and said indefinite field does not belong to an field group; and based upon the field group stored in said field group storage, obtaining the pair in which the definite fields belong to the identical field group, out of the pairs in which said correlation value exceeds a predetermined threshold in the tables, grouping the indefinite fields of said pairs as a new field group, and registering it into said field group storage.

14. A non-transitory recording medium stored a program of a field collation for causing an information processing device comprising:

a field group storing unit in which table information for identifying a table, field information for identifying fields in the above table, and field group information indicative of a definite field for which a correspondence has become definite between the tables, out of the fields in the above table, and a correspondence between said definite fields have been stored correspondingly to each other; and a field correlation storing unit in which said table information, indefinite field information for identifying an indefinite field for which a correspondence is indefinite between the tables, out of the fields in the table of said table information, the definite field information of the definite field, out of the fields in the table of said table information, and a correlation value between said indefinite field and said definite field are stored correspondingly to each other to group the fields corresponding to each other between the different tables, said program causing said information processing device to execute the processes of:

based upon said table information, said field information, and said field group information stored in said field group storing unit, calculating a correlation value between the indefinite field and the definite field information within the identical table, and storing a result in said field correlation storing unit; and out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering the field group information of the above group into said field group storage so that it corresponds to the field information of the indefinite fields of the new field group.

15. A field collating device for employing a field group storage in which a field group in which fields corresponding to each other between tables have been grouped has been stored, thereby to group the fields corresponding to each other between the different tables, said field collating device comprising:

hardware, including a processor;

a field correlation value calculator implemented at least by the hardware for, in each table, making a pair of a definite field, and an indefinite field within an identical table, and calculating a correlation value between the definite field and the indefinite field of said pair, wherein said definite field belongs to any field group and said indefinite field does not belong to any field group; and a field group determining unit implemented at least by the hardware for, based upon the field group stored in said field group storage, obtaining the pair in which the definite fields belongs to the identical field group, out of the pairs in which said correlation value exceeds a predetermined threshold in the tables, grouping the indefinite fields of said pairs as a new field group, and registering it into said field group storage.

16. A field collating device for employing:

hardware, including a processor;

a field group storing unit implemented at least by the hardware in which table information for identifying a table, field information for identifying fields in the above table, and field group information indicative of a definite field for which a correspondence has become definite between the tables, out of the fields in the above table, and a correspondence between said definite fields have been stored correspondingly to each other; and a field correlation storing unit implemented at least by the hardware in which said table information, indefinite field information for identifying an indefinite field for which a correspondence is indefinite between the tables, out of the fields in the table of said table information, the definite field information of the definite field, out of the fields in the table of said table information, and a correlation value between said indefinite field and said definite field are stored correspondingly to each other, thereby to group the fields corresponding to each other between the different tables, said field collating device comprising:

a field correlation value calculator for, based upon said table information, said field information, and said field group information stored in said field group storing unit, calculating a correlation value between the indefinite field and the definite field information within the identical table, and storing a result in said field correlation storing unit; and a field group determining unit for, out of an indefinite field aggregation in which the correlation value stored in said field correlation storing unit is equal to or more than a predetermined threshold, determining the indefinite field belonging to a field group identical to the field group, to which the definite field corresponding to the above indefinite field belongs together with the definite field of the different table, based upon said field group information, grouping the indefinite fields belonging to a field group identical to the field group, to which the corresponding definite field belongs, as a new field group, and registering the field group information of the above group into said field group storage so that it corresponds to the field information of the indefinite fields of the new field group.

17. A field collating device according to claim 15, wherein said field correlation value calculator, when calculating the correlation value between the two fields, employs calculations method that differs responding to a combination of the field types of two fields, wherein said calculation methods include a first calculation method when the field types are a category and a category, a second calculation method when the field types are a category and a numerical value, and a third calculation method when the field types are a category and a character string.

18. A field collating device according to claim 15, comprising a displaying controller for displaying a correspondence relation of the fields grouped as a new field group.

19. A field collating device according to claim 15, comprising a displaying controller for displaying a correlation of the fields in which the correlation value with the field grouped as a new field group is equal to or more than a predetermined threshold.

20. A field collating device according to claim 15,
wherein said field correlation value calculator calculates a correlation value between a plurality of definite fields, and one indefinite field; and
wherein said field group determining unit obtains the pair in which said plurality of said definite fields belong to the identical field group, out of the pairs in which said correlation value exceeds a predetermined threshold, and groups the indefinite fields of the pair in which said definite fields belong to the identical field group as a new field group.

21. A field collating device according to claim 15,
wherein said field correlation value calculator calculates a correlation value between a plurality of the definite fields and the one indefinite field; and
wherein said field group determining unit, out of the indefinite field aggregation in which said correlation value is equal to or more than a predetermined threshold, determines the indefinite fields belonging to a field group identical to the field group, to which each of a plurality of the definite fields corresponding to the above indefinite field belongs, based upon said field group information, groups these indefinite fields as a new field group, and registers it into said field group storage.

22. A field collation system according to claim 7, wherein said field correlation value calculator, when calculating the correlation value of the two fields, employs calculation methods that differs responding to a combination of the field types of two fields, wherein said calculation methods include a first calculation method when the field types are a category and a category, a second calculation method when the field types are a category and a numerical value, and a third calculation method when the field types are a category and a character string.

23. A field collation system according to claim 7, comprising a displaying controller for displaying a correspondence relation of the fields grouped as a new field group.

24. A field collation system according to claim 7, comprising a displaying controller for displaying a correlation of the fields in which the correlation value with the field grouped as a new field group is equal to or more than a predetermined threshold.

25. A field collation system according to claim 7,
wherein said field correlation value calculator calculates the correlation value between a plurality of the definite fields, and the one indefinite field; and
wherein said field group determining unit obtains the pair in which said plurality of said definite fields belong to the identical field group, out of the pairs in which said correlation value exceeds a predetermined threshold, and groups the indefinite fields of the pair in which said definite fields belong to the identical field group as a new field group.

26. A field collation system according to claim 7,
wherein said field correlation value calculator calculates the correlation value between a plurality of the definite fields and the one indefinite field; and
wherein said field group determining unit, out of the indefinite field aggregation in which said correlation value is equal to or more than a predetermined threshold, determines the indefinite fields belonging to a field group identical to the field group, to which each of a plurality of the definite fields corresponding to the above indefinite field belongs, based upon said field group information, groups these indefinite fields as a new field group, and registers it into said field group storage.

27. A field collation device according to claim 16, wherein said field correlation value calculator, when calculating the correlation value between the two fields, employs calculation methods that differs responding to a combination of the field types of two fields, wherein said calculation methods include a first calculation method when the field types are a category and a category, a second calculation method when the field types are a category and a numerical value, and a third calculation method when the field types are a category and a character string.

28. A field collating device according to claim 16, comprising a displaying controller for displaying a correspondence relation of the fields grouped as a new field group.

29. A field collating device according to claim 16, comprising a displaying controller for displaying a correlation of the fields in which the correlation value with the field grouped as a new field group is equal to or more than a predetermined threshold.

30. A field collating device according to claim 16,
wherein said field correlation value calculator calculates a correlation value between a plurality of definite fields, and one indefinite field; and
wherein said field group determining unit obtains the pair in which said plurality of said definite fields belong to the identical field group, out of the pairs in which said correlation value exceeds a predetermined threshold, and groups the indefinite fields of the pair in which said definite fields belong to the identical field group as a new field group.

31. A field collating device according to claim 16,
wherein said field correlation value calculator calculates a correlation value between a plurality of the definite fields and the one indefinite field; and
wherein said field group determining unit, out of the indefinite field aggregation in which said correlation value is equal to or more than a predetermined threshold, determines the indefinite fields belonging to a field group identical to the field group, to which each of a plurality of the definite fields corresponding to the above indefinite field belongs, based upon said field group information, groups these indefinite fields as a new field group, and registers it into said field group storage.

* * * * *